United States Patent

[11] 3,627,137

[72] Inventor Milan Bier
 5341 East 7th St., Tucson, Ariz. 85711
[21] Appl. No. 766,592
[22] Filed Oct. 10, 1968
[45] Patented Dec. 14, 1971

[54] DIALYZING MEMBRANE ENVELOPE
 21 Claims, 1 Drawing Fig.
[52] U.S. Cl. ..................................... 210/321
[51] Int. Cl. ..................................... B01d 31/00
[50] Field of Search .......................... 210/22, 321

[56] References Cited
UNITED STATES PATENTS
3,332,746 7/1967 Claff et al. ............... 210/321 X
3,464,562 9/1969 Meyers et al. ............ 210/321
3,488,690 1/1970 Ross et al. ............... 210/321

OTHER REFERENCES

Crescenzi et al., " Development of a Simplified Membrane Oxygenator," from Trans. Amer. Soc. for Artif. Int. Organs, Vol. 5, 1959, pp. 148– 156 relied on.

Kylstra et al., " Further Development of an Ultra-thin Teflon Membrane Gas Exchanger," from Trans. Amer. Soc. for Artif. Int. Organs, Vol. 7, 1961, pp. 355– 360 relied on.

Shinaberger et al., " Further Development and Clinical Evaluation of the Klung Dialyzer," from Trans. Amer. Soc. for Artif. Int. Organs, Vol. XII, published June 10, 1966, pp. 363– 367 relied on.

*Primary Examiner*—Frank A. Spear, Jr.
*Attorney*—Christen & Sabol

ABSTRACT: A parallel flow dialyzer suitable for use as an artificial kidney utilizes a dialyzing membrane envelope spread within and sealed to an outer frame. This membrane envelope may comprise plastic netting which provides the necessary support for the membranes and channels for the flow of dialyzate, while at the same time causes some mixing of blood, thus improving on the performance of the dialyzer. It also permits greatly simplified design of outer boards containing said envelope. The envelope is manufactured mainly through the use of double-coated pressure-sensitive adhesive tape.

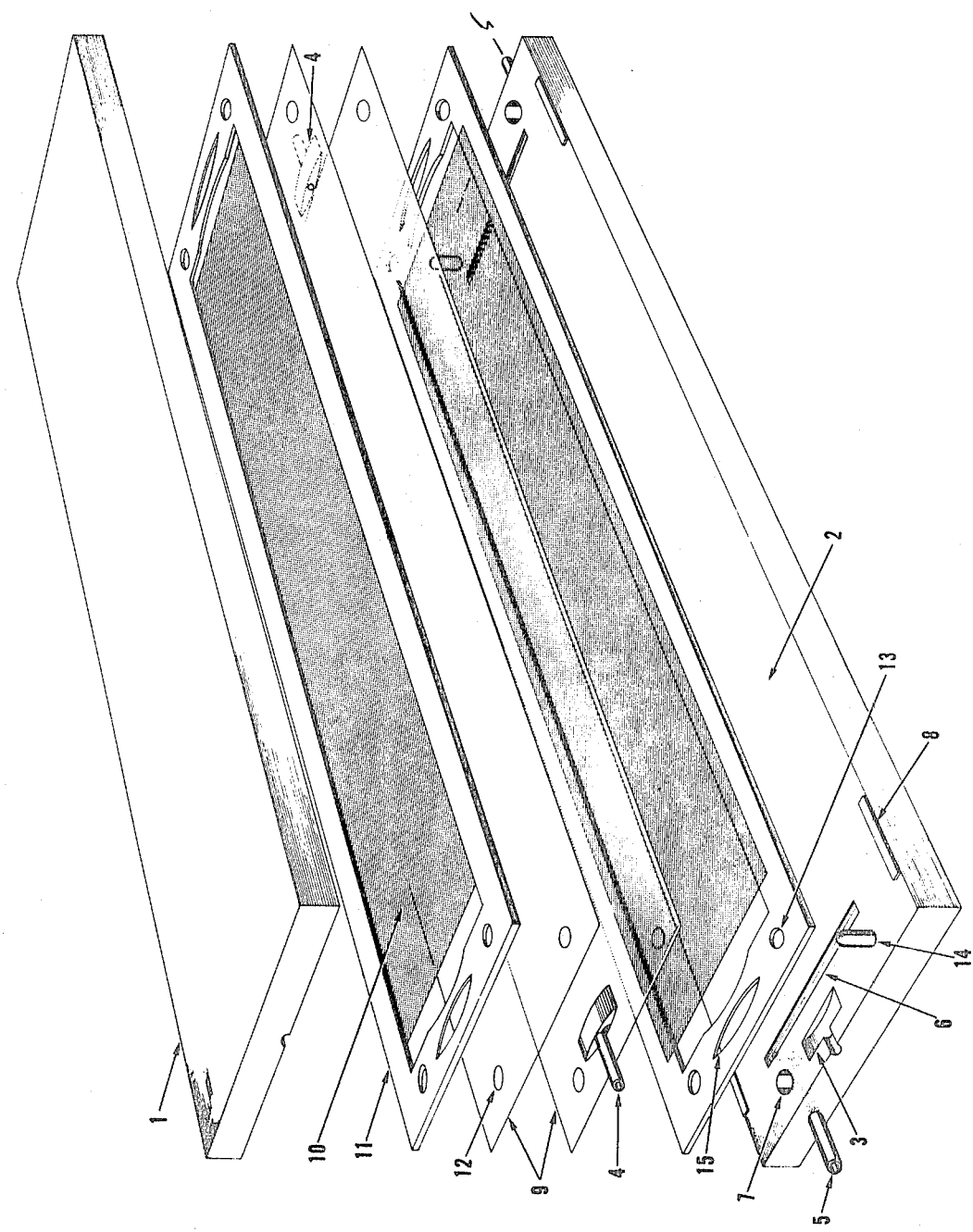

DIALYZING MEMBRANE ENVELOPE

A nonexclusive, irrevocable royalty free license to make and use for governmental purposes the invention described herein has been granted to The United States Government.

The invention relates to the development of a dialyzing membrane envelope suitable to be used in artificial kidneys, means to contain it and method of its manufacture.

Two general types of dialyzers are mainly used as artificial kidneys. One kind is referred to as the coil type and contains the dialyzing membrane casing would in a coil. It is usually provided as a prepackaged coil, intended as a disposable unit. The second kind is referred to as parallel flow dialyzer, and it contains the dialyzing membranes encased between parallel flat boards, providing the indispensable membrane support. This type of dialyzer provides certain advantages, for instance, better control of the dimensions of the blood layer contained within the membranes, but it usually requires complex design of the surfaces supporting the membranes to permit adequate flow of the dialyzate. In addition, this type of dialyzer is usually hand assembled, rather than prepackaged, requiring individual handling of the delicate dialyzing membranes, as well as individual sterilization and testing for leakage.

A principal object of the invention is to provide a dialyzing membrane envelope suitable for use in parallel flow dialyzers, through which envelope blood is to be circulated, wherein the membranes constituting the membrane envelope are spread within and sealed to an outer frame, said frame carrying attached to it blood inlet and outlet ports and providing sufficient rigidity to the membrane envelope for its easier handling g.

Another object of the invention is to provide both dialyzing surfaces of said membrane envelope with a membrane supporting netting, contained within said outer frame, this membrane supporting netting causing gentle mixing of the blood layer within the membrane envelope, thus making the performance of the dialyzer less sensitive to variations in blood film thickness.

Another object of the invention is to provide a membrane envelope with a membrane supporting netting, this netting preventing the contact between membranes and sharp edges of supporting solid boards, thus greatly reducing the danger of rupture of blood containing membranes due to excess internal pressure.

Another object of the invention is to provide said membrane envelope with an outer frame which can act as a gasket, preventing the leakage of either the blood or dialyzate, and obviating the necessity of gaskets in the solid supporting boards.

Another object of the invention is to provide membrane envelopes which can be tested against leakage and presterilized prior to their use, as part of their manufacturing process.

Another object of the invention is to provide presterilized and pretested disposable membrane envelopes to be used in parallel flow dialyzers, simplifying the problem of their assembly and subsequent use.

Another object of the invention is to provide a dialyzer suitable for use as an artificial kidney, which consists of outer parallel rigid boards of simplified design containing sandwiched in between them one or more of said membrane envelopes with membrane supporting netting facing both sides of the envelope, whereby the longitudinal flow of dialyzate is channeled through the mesh, rather than through grooves provided on the rigid boards.

Another object of the invention is to provide simple means of manufacture of said membrane envelope.

Other objects and advantages will be apparent from a consideration of the specifications and claims.

The generally preferred artificial kidney of the parallel flow type for chronic hemodialysis is presently the so called Kiil dialyzer, first described by Fredrik Kiil (Development of a Parallel-Flow Artificial Kidney in Plastics, Acta Chir. Scand. Supplement 253: 142, 1960). The Kiil dialyzer is simple in concept and effective in practice but has some shortcomings, which are common to most parallel flow dialyzers. These are:

1. The high initial cost due to precision machining it requires to provide adequate membrane support area and channelling for flow of dialyzate.
2. The high degree of skill needed for its assembly.
3. The necessity of testing against leakage and sterilizing each kidney individually after its assembly.
4. The need of having accurately controlled average thickness of blood layer in the neighborhood of 0.005 to 0.010 inches thickness for maximum mass transfer due to the laminar flow of blood and dialyzate within the dialyzer.
5. Susceptibility to membrane rupture by too high internal pressure caused by relatively sharp edges of the supporting boards.

The above shortcomings are avoided in the present invention, a preferred version of this invention being shown in an exploded relation in the single FIGURE of the drawing.

For reasons of simplicity only a single layer assembly is shown, while in practice a customary double layer system is used to provide sufficient membrane area. Boards 1 and 2 provide two basically flat and parallel surfaces limiting the expansion of the membrane envelope. In addition, they are provided with recess 3 for the seating of blood inlet and outlet ports 4, and with dialyzate inlet and outlet ports 5 as well as the dialyzate distribution channels 6, connected to the inlet and outlet ports 5 by means of manifolds 7. These boards can be conveniently made of solid polypropylene, ⅜ inch to 1 inch in thickness, or of other similar materials, solid or porous. If necessary such boards can be rendered flat and parallel by flycutting, surface grinding, molding, etc. In comparison to the usual Kiil dialyzer board, their design is amazingly simplified as the precision machining or membrane support grooves is avoided. If these boards are made of relatively expensive material such as polypropylene, they are intended to be reuseable and are considered as a permanent part of the dialyzer. If made of cheaper material, such as rigid polyurethane foam, they may be made of integral part of the disposable membrane envelope. In actual use, the two boards are compressed together by means of external clamps not shown in this illustration, but well familiar to those skilled in the art of dialyzers. Compression limit stops 8 regulate the spacings of the boards in actual use, and prevent overcompression of the membrane envelope. These stops can be made an integral part of the boards, can be affixed to the boards by screws, or by other means, or can be also made an integral part of the membrane envelope.

The dialyzing membrane envelope comprises two dialyzing membranes 9, two plastic membrane support nettings 10, blood inlet and outlet ports 4, and two gasketing frames 11. In the drawing these components are shown separately in their proper sequence. In practice all these components are cemented together and constitute a unitary dialyzing membrane envelope. Its process of manufacture is of some importance and will be discussed later on. It is intended to be used as a disposable part of the dialyzer, whether the above mentioned boards are permanent or disposable. Holes 12 match the dialyzate flow distribution manifold holes 7, and holes 13 match the centering pins 14 which may be provided on the supporting boards to facilitate the assembly of the dialyzer. The oval cutout 15 within the gasketing frames is provided to facilitate the seating of ports 4 within the depressions 3 in the outer boards.

In a preferred form of the invention, the usual cuprophane membranes, manufactured by J. P. Bemberg A.G., Germany, may be used, but other dialyzing membranes are equally well suitable. The membrane supporting grid should be made of soft and pliable material so as to conform to the outer supporting board under the differential pressure customarily existing between the inner blood compartment and the outer dialyzate compartments. Low density polyethylene netting, manufactured by E. I. DuPont DeNemours, under the trademark Vexar, Grade 15 ADS 129, has been found suitable but other similar netting or mesh, possessing comparable characteristics, could be equally well suited.

When used with above simplified boards, the pattern and configuration of the membrane supporting netting becomes of importance. In some types of extruded plastic netting, both sets of strands, running transverse to each other, lie in the same plane. Such extruded netting is not desirable. What is preferred is either woven or extruded netting where the two sets of strands, transverse to each other, lie in two superimposed planes. In such netting, one set of strands, oriented in the direction of the desired flow of dialyzate, i.e., in the longitudinal direction of the dialyzer, provides a parallel set of narrow channels through which the dialyzate can flow from one end of the dialyzer to the other. The transverse set of strands, forming the grid of the netting, are then interposed to the direction of flow of the blood and of the dialyzate, and cause blood and dialyzate not to flow in layers of uniform thickness, but in layers of varying thickness, defined by the catenary shape of the two membranes supported by the grid. This causes gentle mixing of the blood and dialyzate layers, within their respective compartments. Laminar flow of blood, characteristic of the flow of viscous liquids in parallel wall compartments, is prevented. With laminar flow of blood, thickness of the blood layer is of critical importance for the optimizing of the performance of a dialyzer, as is well known in the art (see, for instance, Lars Grimsrud and Albert L. Babb; Optimization of Dialyzer Design for the Hemodialysis System, Transactions Amer. Soc. for Art. Int. Organs, V. 10: 101, 1964). To the contrary, in a well-mixed compartment, diffusion through a membrane is function only of the membrane area, but not of the thickness of liquid layer. As a result, the use of above described netting results in increased performance of the dialyzer, as will be shown in the examples, and decreased dependence on the rigid control of blood film thickness.

Plastic netting having from 5 to 50 strands per inch was found suitable, the diameter of the strands varying from 0.100 to 0.010 inch. The netting should cover the dialyzate distribution grooves 6 of the board, thus protecting the membranes from the cutting effect of the sharp edges of these grooves. This results in greatly increased resistance of the membranes against rupture, as will be shown in examples. A positive pressure differential between blood and dialyzate compartments is always desired as it brings about loss of water from the blood by ultrafiltration, which is a desirable adjunct of any artificial kidney treatment. With conventional Kiil boards, pressure differentials of in excess of 150 mm. mercury pressure are not recommended because of danger of rupture. With membranes protected by plastic netting, pressures of in excess of 750 mm. mercury were well tolerated, and did not cause breakage of membranes.

The netting should not extend the full length of the frames, but should terminate about ¼ inch to ¾ inch before the inner edges of the frames 11 on both longitudinal ends of the dialyzer. This provides for an increased thickness of blood layer between the membranes on that part left unsupported by the plastic netting, these layers serving to distribute the flow of blood more uniformly across the width of the dialyzer.

Blood inlet and outlet ports 4 can be of commercially available design.

The choice of gasketing material is of utmost importance. It should be sufficiently rigid to provide adequate support for the whole finished assembly and yet it should be sufficiently compressible to provide adequate gasketing of the whole assembly and prevent leakage of either blood or dialyzate. Foamed polystyrene in sheets of thickness between 0.020 and 0.150 inch thickness has been found adequate and can be readily stenciled to the desired shape by steel rule die. Other compressible materials such as closed cell polyurethane or polyethylene foam would be equally suitable, either stenciled out of flat stock or custom molded in the desired shape.

The manufacturing process of the finished membrane envelope is of considerable importance and is deemed an integral part of the invention. In this process dialyzing membranes have to be cemented to each other as well as to the membrane supporting netting and outer frames. Cementing of membranes is a notoriously difficult task as aqueous latex-type adhesives cause membranes to wrinkle, while organic solvent containing cements tend to destroy the cell structure of the styrofoam gasket. In addition, the plastic netting provides only very limited bonding area. It has been discovered that this cementing can be accomplished through the use of double-coated pressure-sensitive adhesive tape applied to those areas of frames and/or membranes that have to be attached to each other. The loosely cemented envelope has then to be compressed together within a device essentially similar to the outer boards 1 and 2. This compression not only cements flat surfaces to each other but also forces the highly compressible styrofoam gasket into the openings of the plastic mesh, in a pattern complementary to that of the netting, thus assuring their secure bonding and retention within the envelope. This compression during the cementing process should not exceed the compression to which the spacer will have to be exposed during its actual use, governed by the compression stops 8, but should reduce the thickness of the gaskets by at least 10 percent of their precompressed value.

During this cementing compression, excessive bulging of the membranes is prevented by the compressing device and internal gas pressure can be applied to the membrane envelope to test for the presence of possible pin holes which would cause eventual blood leakage.

During the cementing process, the proper spreading and centering of the membranes and the plastic netting is important. If these are too loose they will flap in the finished membrane envelope, while if too tight they will cause deformation of the outer frame. Proper tension can be brought about by spreading membrane and overlying netting on a flat surface and covering it with flat plate held in place by either mechanical or, preferably, magnetic means. The covering metal plate has dimensions slightly smaller than the inside opening of the envelope frame. While thus securely held, membrane and netting can be simultaneously positioned and cemented on the gasketing frame in a single operation.

Finished envelopes have to be preserved in a protective dry atmosphere, for instance in a sealed plastic envelope, as exposure of membranes to air moisture will cause their shrinkage and deformation of the gasket frame. Sterilization can be carried out with low moisture ethylene oxide gas in a manner well known to the art.

In usage, presterilized membrane envelopes are removed from their protective plastic envelope, and positioned within the outer boards, proper care being taken of the alignment of the blood inlet ports and dialyzate distribution holes. Sterile blood tubing is then connected to the blood inlet and outlet ports and the whole assembly tightened by means of clamps (not shown) but well familiar to anyone versed in the art. The tightening of the assembly is regulated by the compression limit stops. Blood holding volume of the assembled dialyzer is a direct function of the ultimate compression, as will be shown in the examples. Pressure gradients necessary for the flow of blood and dialyzate are low, unless the assembly is overtightened as will also be shown.

While above description covers a preferred design embodying the concept of the membrane envelope contained within an outer frame, other designs are obviously possible to make it adaptable to either conventional Kiil-type boards, having the usual channelling for dialysis flow, or to other types of parallel flow dialyzers. In its simplest formulation, the membrane envelope can be reduced to the two membranes, cemented together within an outer frame, said frame holding in the proper position the blood inlet and outlet ports and dialyzate distribution holes. This outer frame may be as thin as the actual double-coated pressure-sensitive tape itself, and yet provide significant increase in the mechanical rigidity of the membranes to greatly facilitate their positioning in the dialyzer. In such a version of the apparatus the beneficial effect to transverse strands of the membrane supporting netting and the protective effect of the netting are obviously lost.

The following examples are given to illustrate the effectiveness of the new dialyzer under a variety of conditions but not to limit the invention:

EXAMPLE 1

This example is given to show the effectiveness of the dialyzer in causing mass transfer of certain substances between two aqueous saline solutions. The dialyzer employed was of the same type as shown in the drawing, using a single dialyzing membrane envelope with membrane supporting netting and the simplified boards. Its total effective membrane area was 4825 cm.$^2$. The data are compared with results obtained with a conventional Kiil dialyzer, used also in a single layer assembly, with a total effective membrane area of 5045 cm.$^2$. Cuprophane membranes were used in both assemblies, and all other conditions of the experiments were identical.

The liquid to be dialyzed was a normal saline solution, to which urea, creatinine and sodium phosphate were added in portions normally found in blood. It was flown in single pass through the membrane envelope at 75 ml./min. It was dialyzed against another aliquot of the same saline solution, free of the three above mentioned compounds. This was circulated also in a single pass, at 300 ml./min. All experiments were conducted at room temperature.

The data reported represent the averages of 5 experiments with the new dialyzer and 5 with the Kiil dialyzer, for each experiment a new assembly having been used. During each experiment, at least 3 liquid samples were analyzed, taken at various time intervals. The results are presented in terms of customary "dialysance values."ABialysance of a substance is the volume of liquid being dialyzed which is completely freed in the dialyzer of that substance per unit of time. It is calculated by the simple equation $$D = Q \, C_i - C_o / C_i$$

where $D$ is the dialysance (ml./min.), $C_i$ and $C_o$ the inflowing and outflowing concentrations, respectively, of the particular substance in the liquid being dialyzed. The numbers in parenthesis are the standard deviations of dialysance values, calculated in the usual way.

| Dialyzer | Dialysances (ml./min.) | | |
|---|---|---|---|
| | Urea | Creatinine | Phosphate |
| New Dialyzer | 44.5 (1.3) | 32.7 (1.4) | 22.3 (1.1) |
| Conventional Kiil Dialyzer | 40.5 (1.5) | 29.3 (1.5) | 19.5 (1.9) |

The data show the new dialyzer to have dialysance values about 10 percent higher than conventional Kiil dialyzer. This becomes even more significant in view of the fact that the new dialyzer had about 5 percent less effective membrane area than the Kiil dialyzer.

EXAMPLE 2

This example is given to illustrate the effectiveness of the dialyzing membrane envelope when used in combination with standard Kiil boards, rather than simplified boards. The dialyzing membrane envelope was of the same type as used in example 1, including the plastic netting used as membrane support. The date are again compared with the performance of the conventional Kiil boards, assembled in the usual way. These two sets of data, therefore, compare directly the performance of a set of Kiil boards used in the conventional manner with the same set of Kiil boards used with the newly developed membrane envelope.

The liquid to be dialyzed was bovine blood, collected on slaughter, and defibrinated by whipping. It was dialyzed against a dialyzate fluid of the type used in artificial kidney treatments. All conditions of experiments were the same as in example 1, except that the experiments were carried out at 37° C. The data reported are average values of three experiments each, using the new membrane envelope, and the conventional Kiil assembly, with at least three analytical measurements in each experiment.

| Dialyzer | Dialysances (ml./min.) | | |
|---|---|---|---|
| | Urea | Creatinine | Phosphate |
| Membrane Envelope in Kiil Boards | 42.7 (2.8) | 39.9 (2.5) | 34.0 (1.5) |
| Conventional Kiil Assembly | 39.6 (1.5) | 34.8 (2.5) | 31.6 (2.8) |

Data show again improved performance of the new membrane envelope.

EXAMPLE 3

This example is given to illustrate the effectiveness of the new membrane envelope as a hemodialyzer, in an in vivo experiment, using sheep as the blood donor. This experiment has been carried out under conditions most resembling those employed in clinical usage of artificial kidneys. The dialyzer employed was the same as in example 1, and the same conditions of flow were maintained.

| Dialyzer | Dialysances (ml./min.) | | |
|---|---|---|---|
| | Urea | Creatinine | Phosphate |
| New Dialyzer | 41.7 | 37.8 | 33.1 |
| Conventional Kiil Dialyzer | 38.5 | 34.2 | 29.9 |

EXAMPLE 4

This example is given to illustrate the greater safety of the new dialyzer, in prevention of membrane ruptures by excessive internal pressure. In three separately assembled dialyzers, the blood compartment was exposed to gradually increasing internal pressures. The apparatus described in example 1 was employed. The wet membranes of the netting supported envelope withstood without rupture internal pressures of up to 1,000 mm. mercury pressure. At higher pressures, the membranes still did not rupture, but there was lateral leakage of content through the cemented seams of the envelope. Comparable experiments using conventional Kiil boards as membrane supports invariably resulted in breakage of membranes at pressures ranging from 100 to 450 mm. mercury pressure.

EXAMPLE 5

Example 5 is given to illustrate the relative insensitivity of the performance of the new dialyzer on average blood film thickness. This thickness can be varied by appropriate selection of compression limit stops, 8 and is experimentally determined through measurement of blood volume. The cross area of the membrane envelope being about 2,400 cm.$^2$, an average blood film thickness increment of 0.025 cm. (0.010 inch) will increase the blood holding volume of a single envelope by nearly exactly 60 ml. The data presented include also the pressure differential between inflowing and outflowing blood, i.e., the drop in blood pressure across the membrane envelope.

The same dialyzer as described in example 1 was employed. Other conditions were similar to those described in example 2, namely bovine blood was dialyzed at 38° C., with a flow rate of 75 ml./min.

| | Average blood film thickness (cm.) | Blood pressure drop (cm. water pressure) | Dialysance (ml./min.) | |
|---|---|---|---|---|
| | | | Urea | Phosphate |
| Blood volume (ml.): | | | | |
| 175 | 0.073 | 2.5 | 40.5 | 33.1 |

Continued

|  | Average blood film thickness (cm.) | Blood pressure drop (cm. water pressure) | Dialysance (ml./min.) | |
|---|---|---|---|---|
|  |  |  | Urea | Phosphate |
| Blood volume (ml.): |  |  |  |  |
| 110 | 0.046 | 6.0 | 42.3 | 32.3 |
| 82 | 0.034 | 8.5 | 42.3 | 33.5 |
| 55 | 0.023 | 15.0 | 42.2 | 35.1 |

These data show that close control of average blood film thickness is not necessary to optimize the performance of the dialyzer, and that the blood volume can easily be maintained below 100 ml. per envelope without causing excessive drop in blood pressure.

EXAMPLE 6

This example is given to illustrate the use of a simple membrane envelope, constituted by two membranes cemented together to a frame constituted only of mylar backed double-faced pressure-sensitive tape, and carrying the blood inlet and outlet ports. It was contained within standard Kiil boards, which provided the channelling for dialyzate flow, which were necessary as the membrane envelope did not comprise the plastic netting. A single experiment was carried out, duplicating the conditions of example 2, using bovine blood.

|  | Dialysances (ml./min.) | | |
|---|---|---|---|
|  | Urea | Creatinine | Phosphate |
| Simplified Membrane Envelope | 38.5 | 35.2 | 30.0 |

I claim:

1. A dialyzing membrane envelope for use in parallel flow dialyzers wherein said membranes constituting the two sides of the membrane envelope are spread within and adhesively sealed to a peripheral frame, said frame carrying attached to it liquid inlet and outlet ports, and said frame conveying to the membrane greater rigidity, said frame being made of closed cell foamed plastic or rubbery material, such as foamed polyurethane, foamed polyethylene, foamed rubber, or foamed polystyrene.

2. A dialyzing membrane envelope as claimed in claim 1, wherein said adhesive seal comprises double-coated pressure-sensitive adhesive tape.

3. A dialyzing membrane envelope claimed in claim 1, pretested for leakage and presterilized for use in artificial kidneys.

4. A dialyzing membrane envelope as claimed in claim 1, wherein plastic netting covers the major part of both outer surfaces of said membrane envelope, and is spread within and sealed to said peripheral frame, said plastic netting protecting said membrane from rupture by underlying sharp edges of the grooved parallel dialyzer boards.

5. A dialyzing membrane envelope as claimed in claim 1 wherein sections of said membrane envelope adjacent to said inlet and outlet liquid ports are left unprotected by said plastic netting, said unprotected sections providing regions of increased depth of liquid layer within said membrane envelope serving to equalize the flow distribution of liquid contained in said membrane envelope along the width of said membrane envelope.

6. A dialyzing membrane envelope as claimed in claim 4, wherein said plastic netting has one set of parallel strands running in the direction of liquid flow within said membrane envelope, said parallel strands forming channels for the flow of dialyzate along the outer surface of said membrane envelope, whereas the transversal set of strands of said plastic netting lies across the direction of liquid flow in said membrane envelope, this set of strands causing mixing of said liquid flowing in said membrane envelope, and preventing the laminar flow of said flowing liquid.

7. A dialyzing membrane envelope as claimed in claim 4, wherein said plastic netting is of low density polyethylene or other similar flexible material.

8. A dialyzing membrane envelope as claimed in claim 4 wherein said plastic netting has from 5 to 50 strands per linear inch, the diameter of said strands being in the range of 0.010 inch to 0.100 inch.

9. A dialyzing membrane envelope as claimed in claim 4, wherein said membranes and plastic netting are adhesively joined to each other by partial compressions, the highly compressible peripheral frame being forced under pressure into the openings of said plastic netting, in a pattern complementary to that of the netting.

10. A dialyzing membrane envelope as claimed in claim 4, wherein said adhesive seal comprises double coated pressure sensitive adhesive tape.

11. A dialyzing envelope as claimed in claim 4, and means to contain said dialyzing envelope, said means providing two essentially flat and rigid surfaces, preventing the ballooning of the membrane envelope, said means having depressions for the seating of liquid inlet and outlet ports, and ports and manifolds for the inlet and outlet and distribution of dialyzate flow.

12. A dialyzing membrane envelope for use in parallel flow dialyzers, wherein said membranes constituting the two sides of the membrane envelope are adhesively sealed to a peripheral frame, said frame carrying attached to it liquid inlet and outlet ports, wherein plastic netting covers the major part of both outer surfaces of said membrane envelope, said plastic netting protecting said membranes from rupture by underlying sharp edges of the grooved parallel dialyzer boards.

13. A dialyzing membrane envelope as claimed in claim 12, wherein said plastic netting is adhesively sealed to said peripheral frame.

14. A parallel flow dialyzing apparatus comprising two or more elongated rigid generally flat boards clamped in face-to-face relationship, dialyzing membrane means sandwiched therebetween, membrane supporting elongated pieces of open mesh plastic netting interposed between said flat boards and said dialyzing membrane means, peripheral gasketing frame means of closed cell foamed plastic or rubbery material, such as foamed polyurethane, foamed polyethylene, foamed rubber, or foamed polystyrene, said gasketing frame means being sandwiched between said clamped boards and defining closed chambers between said boards, said closed chambers containing said dialyzing membrane means and said membrane supporting plastic netting, said apparatus being provided with inlet and outlet means at the opposite ends to admit two separate liquid flows, the first said liquid flow being contained within the interior of said dialyzing membrane means, the second said liquid flow being directed to the exterior of said dialyzing membrane means, said membrane supporting open mesh plastic netting providing the channeling for the passageway of said second liquid flow between said inlet means at the opposite ends of the apparatus through the space defined by the exterior surfaces of said dialyzing membrane means, the interior surfaces of said flat rigid boards and said peripheral gasketing frame means.

15. A parallel flow dialyzing apparatus as claimed in claim 14, wherein said rigid generally flat boards have depressions for the seating of inlet and outlet ports for the first said liquid flow.

16. A parallel flow dialyzing apparatus as claimed in claim 14, wherein said dialyzing membrane means are constituted by dialyzing membrane envelope for use in parallel flow dialyzers wherein said membranes constituting the two sides of the membrane envelope are spread within and adhesively sealed to a peripheral frame, said frame carrying attached to it liquid inlet and outlet ports, and said frame conveying to the membrane greater rigidity, said frame being made of closed cell foamed plastic or rubbery material, such as foamed polyurethane, foamed polyethylene foamed rubber, or foamed polystyrene.

17. A parallel flow dialyzing apparatus as claimed in claim 14, wherein said dialyzing membrane means are constituted by paired sheets of flexible dialyzing membrane materials having a contour to overlap said peripheral gasketing frame means when sandwiched between said boards for sealing engagement with said gasketing frame means.

18. A parallel flow dialyzing apparatus as claimed in claim 14, wherein said dialyzing membrane means are constituted by one or more cylindrical tubings formed by dialyzing membrane materials, kept in flat form by said rigid boards and said membrane supporting plastic netting.

19. A parallel flow dialyzing apparatus as claimed in claim 14, wherein said membrane supporting plastic netting has one set of parallel strands running in the direction of liquid flow within said dialyzing apparatus, said parallel strands forming channels for the flow of said second liquid between said inlet and outlet means at the opposite ends of the apparatus through the space defined by the exterior surfaces of said dialyzing membrane means, the interior surfaces of said flat rigid boards and said peripheral gasketing frame material, whereas the second transversal set of strands of said plastic netting lies across the direction of liquid flow in said dialyzing apparatus, this set of strands causing mixing of said first flowing liquid contained in said dialyzing membrane means, and preventing the laminar flow of said flowing liquid, said two sets of parallel plastic strands not lying in the same plane, but lying in two adjacent planes touching each other only in the crossover points between the two sets of strands.

20. A parallel flow dialyzing apparatus as claimed in claim 19, wherein set first set of parallel strands forming channels for the flow of said second liquid are oriented to lie against said flat rigid boards, said second set of transversal strands being oriented to lie against said dialyzing membrane means.

21. A parallel flow dialyzing apparatus as claimed in claim 14, wherein said membrane supporting plastic netting has from 5 to 50 strands per linear inch, the diameter of said strands being in the range of 0.010 inch to 0.100 inch.